United States Patent
Yoshie

(10) Patent No.: US 8,922,808 B2
(45) Date of Patent: Dec. 30, 2014

(54) ELECTRONIC DEVICE THAT RECEIVES A WAIT-FOR-IMPACT-DETECTION COMMAND

(75) Inventor: Shinichi Yoshie, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1127 days.

(21) Appl. No.: 12/360,289

(22) Filed: Jan. 27, 2009

(65) Prior Publication Data

US 2009/0190170 A1    Jul. 30, 2009

(30) Foreign Application Priority Data

Jan. 30, 2008 (JP) .................................. 2008-018655

(51) Int. Cl.
G06F 3/12 (2006.01)

(52) U.S. Cl.
CPC ............ G06F 3/1274 (2013.01); G06F 3/1204 (2013.01); G06F 3/1205 (2013.01); G06F 3/1258 (2013.01); G06F 3/1267 (2013.01)
USPC ........................................................ 358/1.15

(58) Field of Classification Search
None
See application file for complete search history.

(56) References Cited

U.S. PATENT DOCUMENTS

| | | | |
|---|---|---|---|
| 2002/0001104 A1* | 1/2002 | Shima | 358/442 |
| 2006/0061840 A1* | 3/2006 | Kashibuchi | 358/518 |
| 2007/0003354 A1* | 1/2007 | Tamura et al. | 400/621 |

FOREIGN PATENT DOCUMENTS

| | | |
|---|---|---|
| JP | 2000-246989 | 9/2000 |
| JP | 2003-143683 | 5/2003 |
| JP | 2003-280464 | 10/2003 |
| JP | 2005-332118 | 12/2005 |
| JP | 2006-326841 | 12/2006 |

* cited by examiner

*Primary Examiner* — Jeremiah Bryar

(57) ABSTRACT

An electronic device and control method can detect tapping operations on the device housing to control executing processes, and whether tapping operations are accepted can differ by individual print job. The receipt printer has an impact sensor. The control unit of the receipt printer detects tapping while processing print data and while printing when print data containing a wait-for-tapping-operation and cancel printing command is received, and cancels printing when a predetermined tapping operation is detected. When print data containing a wait-for-tapping-operation and start printing command or wait-for-tapping-operation and cut paper command is received, starting printing or the cutting operation of the automatic paper cutter is suspended and tapping is detected. When the predetermined tapping operation is detected, the suspending printing operation or cutting operation starts.

20 Claims, 4 Drawing Sheets

ELECTRONIC DEVICE THAT RECEIVES A WAIT-FOR-IMPACT-DETECTION COMMAND

CROSS-REFERENCE TO RELATED APPLICATIONS

Japanese Patent application No. 2008-018655, filed Jan. 30, 2008 is hereby incorporated by reference in its entirety.

BACKGROUND

1. Field of Invention

The present invention relates to an electronic device such as a printer that can apply various processes, such as cancelling printing or delaying printing, to print data input thereto in response to specific operations performed on the printer after the print data has been input, and to a control method for the electronic device.

2. Description of Related Art

Printers that have a cancel printing button positioned on an operating panel on the printer and can cancel printing print data that has already been received when the cancel printing button is operated after the print data has been received are known from the literature. For example, when the user operates a cancel button positioned on the operating panel while printing is in progress, the printing device taught in Japanese Unexamined Patent Appl. Pub. JP-A-2006-326841 executes a switch interrupt process corresponding to this operation and interrupts printing.

Japanese Unexamined Patent Appl. Pub. JP-A-2000-246989 teaches an image forming device that reduces the number of operating panels and control buttons located on the printer by using an impact sensor to detect shock and impact applied to any part of the printer housing and execute processes, such as an unconditional paper discharge process, head recovery process, and ink replacement process based on the output from the detector. A configuration command from a host device stores the device states in which impact should be detected and the impact patterns to be detected correlated to the content of the process to be executed when a particular impact pattern is detected in the image forming device. After being configured, the image forming device automatically detects impact according to the device state without requiring additional command input from the host device.

Positioning operating buttons such as a cancel printing button on the printer as described in Japanese Unexamined Patent Appl. Pub. JP-A-2006-326841 greatly increases the limitations on the printer installation, such as preventing placing anything above the operating buttons. Business printers such as receipt printers, for example, are commonly placed on a shelf underneath a counter in order to not take up counter space, and it may not be able to operate the buttons in such situations. In the case of a portable receipt printer that is typically used worn on the user's belt clip, it is preferable to be able to operate the buttons by intuitive touch without looking, but this may inhibit smooth operation because it can be difficult to find the correct button to operate. In addition, when there are multiple buttons to operate, determining the correct button by touch can be difficult, and operating errors can occur.

With a configuration that executes particular processes in response to the user tapping on the device housing as taught in Japanese Unexamined Patent Appl. Pub. JP-A-2000-246989, the device can be operated intuitively and operating buttons can be removed from the housing. However, with the image forming device taught in JP-A-2000-246989, the processes triggered by particular combinations tapping patterns and device states in which impact is detected must be preprogrammed into the device, and configuration can be troublesome. Furthermore, after the printer is configured for impact detection, the operation triggered by impact is always executed when the set device state is active. As a result, it is not possible to change on a per job basis whether or not the process triggered by impact detection executes, and it is not possible to change the content of the process executed in response to impact detection job by job.

SUMMARY OF INVENTION

An electronic device and a control method for an electronic device according to the present invention enable detecting and processing tapping operations on the device housing by means of impact detection, and enable changing whether or not tapping operations will be recognized on a print job basis.

A first aspect of the invention is a control method for an electronic device, the method including a first step of receiving a wait-for-impact-detection command, a second step of enabling an wait-for-impact-detection state in which impact can be detected based on the wait-for-impact-detection command, and a third step of executing a predetermined process conditional upon detecting a predetermined impact in the wait-for-impact-detection state.

Another aspect of the invention is an electronic device including an impact detection unit, and a control unit that enters a wait-for-impact-detection state in which the impact detection unit is enabled when a wait-for-impact-detection command is received, and executes a predetermined process conditional upon the impact detection unit detecting a predetermined impact in the wait-for-impact-detection state.

Because a control method for an electronic device and an electronic device according to the present invention detect impact and execute a predetermined process when impact is applied, it is not necessary to provide on the housing or case of the electronic device operating buttons for controlling the same processes. Intuitive operation is therefore possible, and easy and accurate operation by touch is possible. Greater freedom of design and greater freedom in the installation and placement of the electronic device are also achieved. The electronic device of the invention also enters a wait-for-impact-detection state based on a wait-for-impact-detection command. Operation based on impact detection is enabled only when the wait-for-impact-detection command is received. Whether operations triggered by impact detection are accepted can therefore be controlled individually by print job.

In a control method for an electronic device according to another aspect of the invention, the predetermined impact in the third step is a predetermined number of impacts. This aspect of the invention can suppress operating errors because a process is executed only when the number of impacts reaches the predetermined count.

In a control method for an electronic device according to another aspect of the invention, the electronic device is a printer, and the third step executes a cancel printing process to cancel printing the received print data conditional upon detecting a predetermined impact in the wait-for-impact-detection state. In an electronic device according to another aspect of the invention, the electronic device is a printer, and the control unit executes a cancel printing process to cancel printing the received print data conditional upon detecting a predetermined impact in the wait-for-impact-detection state. With this aspect of the invention the user can cancel printing by simply tapping on the printer housing before printing starts.

In a control method for an electronic device according to another aspect of the invention, the second step activates a wait-for-impact-detection state in which executing a predetermined process is suspended based on the wait-for-impact-detection command, and the third step executes the process suspended in the second step conditional upon detecting a predetermined impact in the wait-for-impact-detection state. More specifically, the second step suspends execution of a start printing process or an automatic printing paper cutting process. This aspect of the invention enables delaying processing until the user taps on the device housing, and executing the process at the time desired by the user.

In an electronic device according to another aspect of the invention the control unit suspends starting printing and enters the wait-for-impact-detection state, and then starts the suspended printing process conditional upon detecting the predetermined impact in the wait-for-impact-detection state. This enables delaying starting printing until the user taps on the device housing.

An electronic device according to another aspect of the invention preferably has a discharge path for discharging a printed portion of the printing paper, and a cutting mechanism positioned in the discharge path. The control unit suspending operation of the cutting mechanism on the printing paper and entering the wait-for-impact-detection state, and then operating the cutting mechanism conditional upon detecting the predetermined impact in the wait-for-impact-detection state. This aspect of the invention prevents cutting off the printed portion of the paper until the user taps on the device housing.

In a control method for an electronic device according to another aspect of the invention, a detection threshold and/or detection count for detecting the predetermined impact is received and stored before the first step. In an electronic device according to another aspect of the invention, the predetermined impact is an impact equal to or greater than a preset detection threshold and/or impact of a predetermined number of times, and the electronic device further comprises a storage unit and stores the detection threshold and/or detection count in the storage unit. In this aspect of the invention the detection threshold for impact detection and the number of impacts to be detected do not need to be included in the wait-for-impact-detection command. The settings also enable changing the detection threshold and impact detection count. Operating errors caused by the user accidentally touching the device housing can also be prevented.

Effect of the Invention

Because the invention detects impact applied to an electronic device and executes a predetermined process accordingly, operating buttons for running the same process are not needed on the device. Intuitive operation is thus possible, and easy, accurate operation by touch is possible. Greater freedom of design and greater freedom in the installation and placement of the electronic device are also achieved.

Furthermore, because the electronic device of the invention enters a wait-for-impact-detection state based on a wait-for-impact-detection command, operation based on impact detection can be limited to only when a wait-for-impact-detection command is received. For example, processing other print data based on impact detection can be prevented. More specifically, whether operation can be triggered by impact detection can be controlled for each individual print job.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of the present invention is described below with reference to the accompanying figures using a receipt printer as an example of an electronic device.

Receipt Printer Configuration

Figure 1:
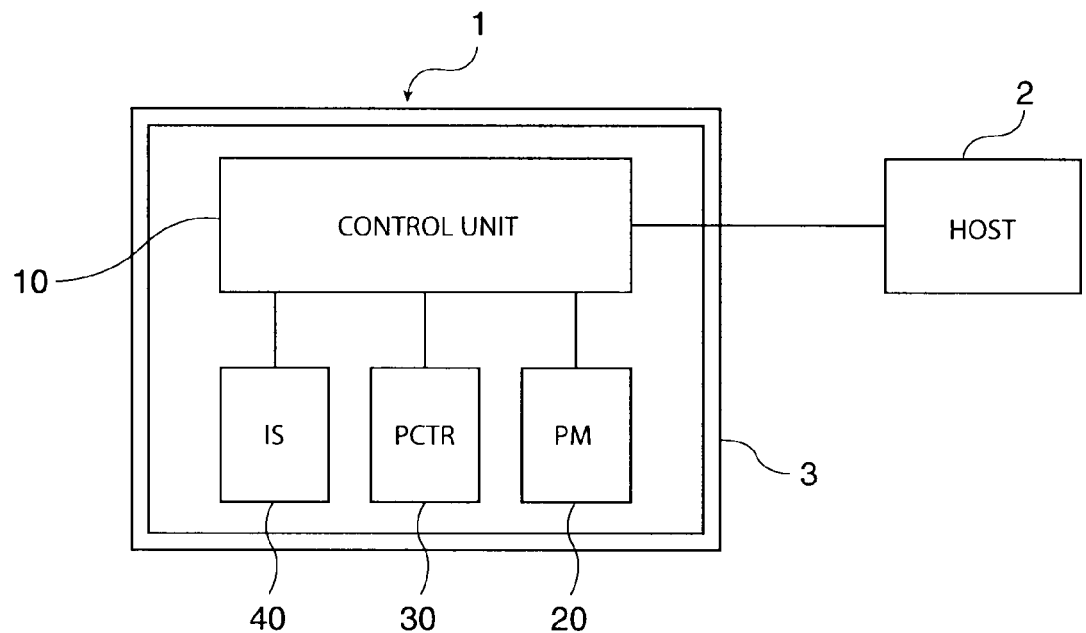
FIG. 1 is a block diagram of a receipt printer according to the present invention.

The receipt printer 1 holds recording paper such as roll paper inside the printer so that the roll can rotate, and when print data is received from the host device 2 prints on the roll paper, cuts the printed portion from the roll, and discharges the printed portion. FIG. 1 is a block diagram of a receipt printer according to this embodiment of the invention.

As shown in the figure, the receipt printer 1 includes a control unit 10 that controls the different parts of the printer, a printing mechanism (PM) 20 that prints on the roll paper according to control signals from the control unit 10, an automatic paper cutter (PCTR) 30 (cutting mechanism) that automatically cuts the printed portion of the roll paper, and an impact sensor (IS) 40 that detects impact on the housing 3 of the receipt printer 1. The receipt printer 1 also has a communication unit for communicating with the host device 2 and a power supply unit not shown.

The control unit 10 includes a processing unit such as a CPU, and storage units such as flash ROM or EEPROM for storing programs and data required for control, and RAM that functions as working memory for data processing by the CPU. Commands and print data from the host device 2 are input through a communication unit to the control unit 10. The communication unit of the receipt printer 1 enables connecting to the host device 2 wirelessly using a wireless LAN adapter, for example, or by wired communication using a USB cable or LAN cable, for example.

The printing mechanism 20 includes a recording head and a drive mechanism for the recording head. The printing mechanism 20 also has a paper feed mechanism for moving an unused portion of the roll paper to the printing position, and conveying the printed portion outside the printer. The printing mechanism 20 also has a drive circuit including a gate array, and a drive motor. When a control signal from the control unit 10 is input to the drive circuit, a motor drive current is supplied to the drive motor. Drive motor output is transferred to drive mechanisms for the paper feed mechanism or recording head, causing those mechanisms to operate.

The automatic paper cutter 30 operates in conjunction with the roll paper feed operation based on control signals from the control unit 10. A paper exit not shown in the figures is formed in the housing 3 of the receipt printer 1, and the printed portion of the roll paper is conveyed through the paper transportation path formed in the receipt printer 1 from the printing position to the paper exit. The automatic paper cutter 30 is positioned to the inside side of the paper exit formed in the housing 3, and includes, for example, a movable knife positioned with the cutting edge facing the surface of the roll paper, a drive mechanism for driving the movable knife, and a stationary knife positioned opposite the movable knife with the roll paper therebetween. When the automatic paper cutter 30 is not operating, the movable knife is retracted from the paper transportation path, and when the automatic paper cutter 30 starts operating, the movable knife advances toward the surface of the roll paper to cut the roll paper located between it and the stationary knife. It will be obvious that the automatic paper cutter 30 is not limited to such a configuration, and other configurations may be used.

While the recording head is operating, the control unit 10 operates the paper feed mechanism to convey the roll paper in conjunction with the printing operation. When the printing operation of the recording head ends, the roll paper is conveyed to discharge the printed portion from the receipt printer 1. For example, the control unit 10 stops the paper feed mechanism after the printed portion and a trailing margin of a predetermined length have passed where the movable knife is positioned in the paper transportation path. Because most of the printed portion of the roll paper is on the outside of the receipt printer 1 from the paper exit at this time, if the automatic paper cutter 30 is operated to cut the roll paper, the printed portion that is severed from the roll paper will fall from the paper exit to the outside of the receipt printer 1. If the user holds the printed portion that is exposed from the paper exit outside the receipt printer 1 before the automatic paper cutter 30 cuts the paper, the user can receive the printed portion before it falls. If the automatic paper cutter 30 is configured so that it does not cut the paper completely, the printed portion can also be prevented from falling.

When the user uses a finger to tap on the housing 3 of the receipt printer 1, the impact sensor 40 detects the impact of this tapping operation. In this embodiment of the invention the part that is tapped by the user to control printer operation is set near the paper exit of the receipt printer 1, and the impact sensor 40 is positioned on the inside side of the housing 3 around the paper exit. The impact sensor 40 may be formed using a reed switch, magnet, and spring, for example. When a predetermined acceleration is applied to the impact sensor 40 by impact on the housing 3, the magnet connected to the spring inside the impact sensor 40 moves, and the magnetic field from the magnet causes the reed switch to operate and output a detection signal. Alternatively, an impact sensor that uses a piezoelectric material or position sensor to measure movement of a pendulum caused by acceleration from an applied impact and detect application of a predetermined impact may be used.

The detection signal from the impact sensor 40 is input to the control unit 10. The control unit 10 determines if the detection signal (acceleration) from the impact sensor 40 exceeds a preset detection threshold (acceleration threshold) by means of an internal detection program. If impact exceeding the preset detection threshold (acceleration threshold) is detected, the control unit 10 counts how many times, and determines if impact exceeding the preset count is detected. The control unit 10 determines from these decisions if the user of the receipt printer 1 performed a specific tapping operation. The detection thresholds used for these decisions are stored in a storage unit in the control unit 10.

Note that the timing of impact may be stored in the storage unit in addition to the detection thresholds and detection counts in order to determine if impact was applied according to a predetermined pattern.

When impact detection configuration data such as the detection threshold (acceleration threshold), detection count (number of taps), or tapping pattern is input from the host device 2, the control unit 10 stores the received impact detection configuration data in a storage unit or updates the previously stored impact detection configuration data.

Figure 2:
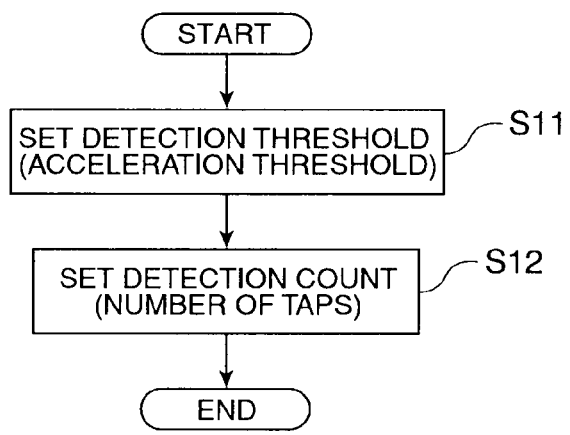
FIG. 2 is a flow chart of a process for configuring the detection threshold, detection count, and other parameters for impact detection.

FIG. 2 is a flow chart of a process for configuring impact detection, including the detection threshold and detection count parameters. In steps S11 and S12 the control unit 10 stores the detection threshold and detection count input to the receipt printer 1 in the storage unit. In this embodiment of the invention the control unit 10 determines that the user has performed a specific tapping operation when impact (acceleration) equal to or greater than the preset detection threshold is detected the preset number of times or more.

Receipt Printer Control

Figure 3:
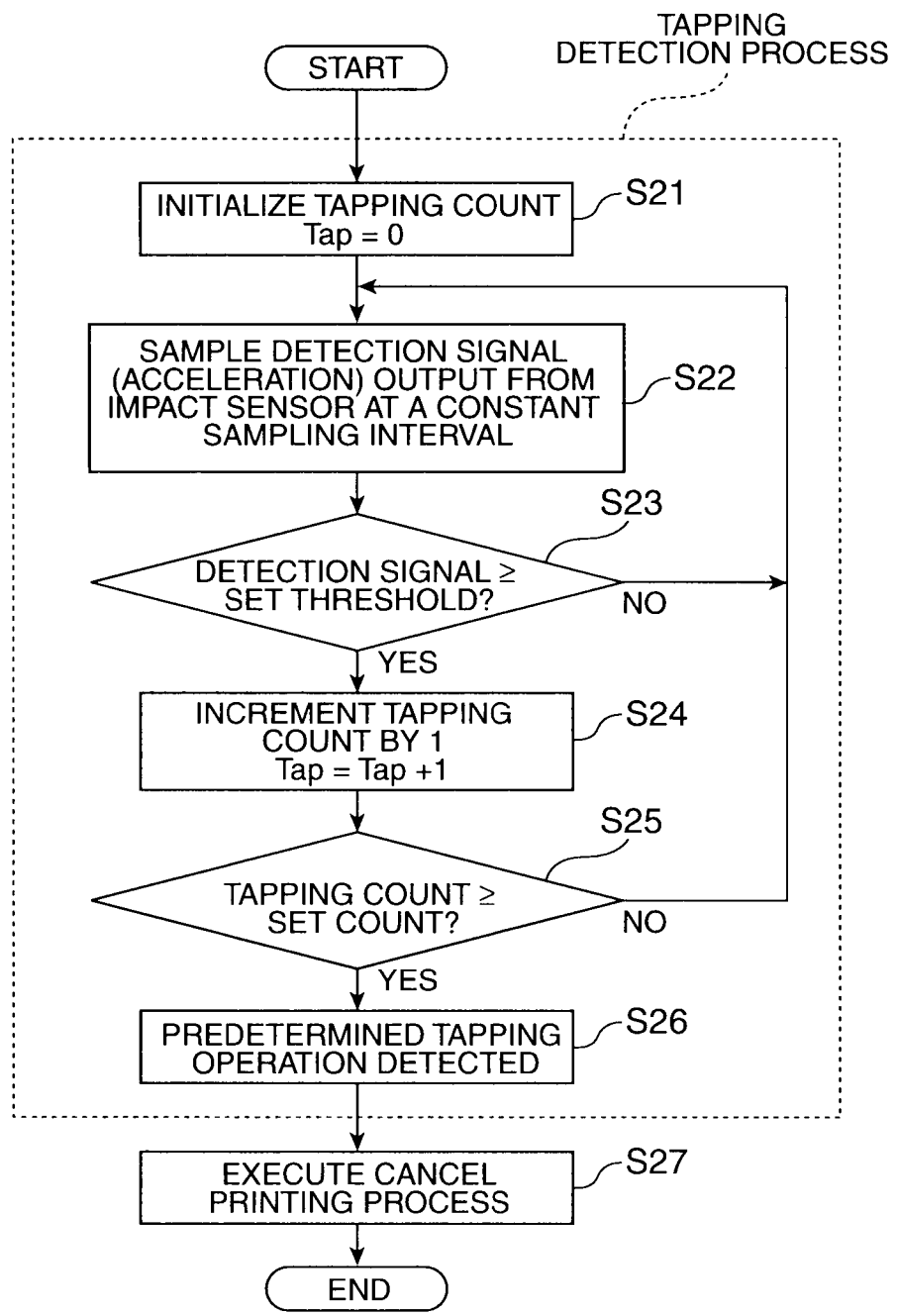
FIG. 3 is a flow chart of a cancel printing control process invoked by a tapping operation.
Figure 4:
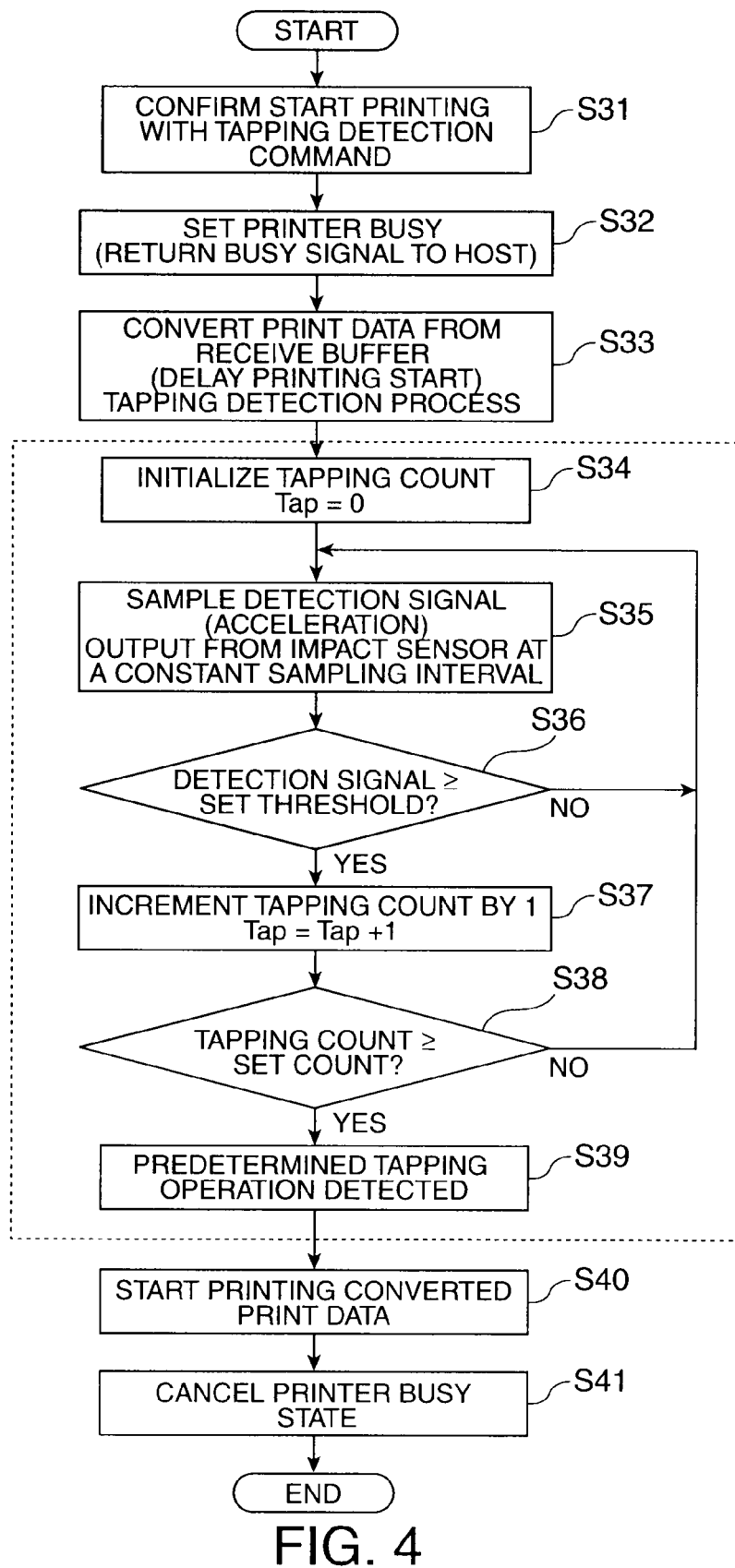
FIG. 4 is a flow chart of a start printing control process invoked by a tapping operation.
Figure 5:
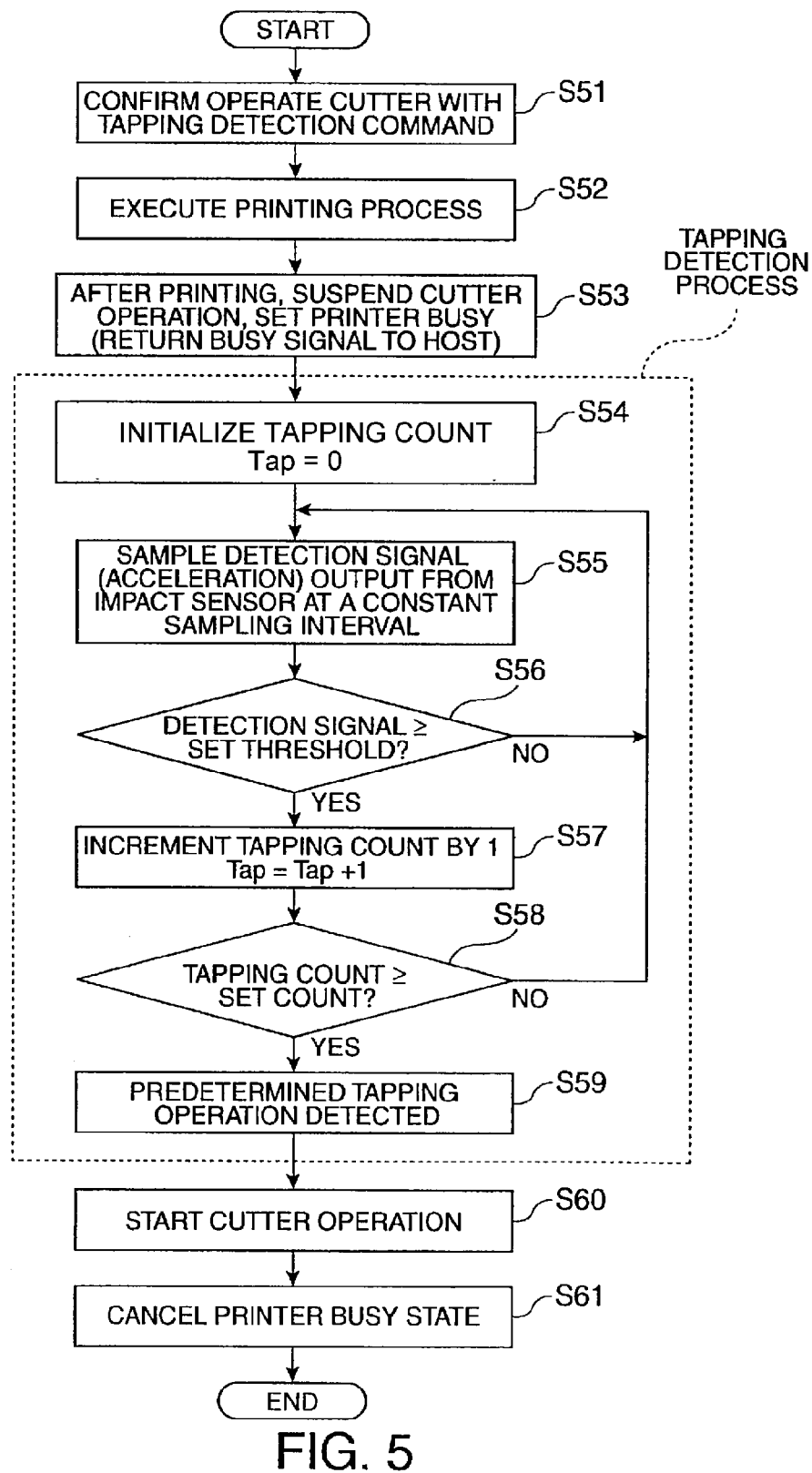
FIG. 5 is a flow chart of a start paper cutter operation control process invoked by a tapping operation.

Controlling the receipt printer 1 described above is described next. The control unit 10 receives print data containing a wait-for-tapping-operation command (wait-for-impact-detection command) from the host device 2 (first step), and executes processes such as shown in FIG. 3 to FIG. 5 when processing the print data received with the wait-for-tapping-operation command.

In this embodiment of the invention the wait-for-tapping-operation commands include a wait-for-tapping-operation and cancel printing command, a wait-for-tapping-operation and start printing command, and wait-for-tapping-operation and cut paper command. The flow charts shown in FIG. 3 to FIG. 5 describe the processes executed when these commands are received as described in (1) to (3) below.

When one of these commands is received, the control unit 10 goes to the wait-for-tapping-operation state (wait-for-impact-detection state) at a predetermined timing (second step) and executes the tapping detection process. When in the wait-for-tapping-operation state, the control unit 10 detects by means of the detection signal from the impact sensor 40 when the user taps the housing 3 of the receipt printer 1 near the paper exit with force greater than or equal to a preset detection threshold a preset number of times, and determines if a preset tapping operation was performed. Triggered by the result of this decision (evaluation), the control unit 10 then executes the cancel printing command to cancel printing the received print data, the start printing command to print to roll paper, or the automatic cutting process to cut the printed portion of the roll paper, for example (third step).

If the receipt printer 1 receives print data that does not include a wait-for-tapping-operation command, the control unit 10 does not respond to tapping operations when processing the print data. More specifically, in this situation the control unit 10 does not evaluate detection of tapping operations based on detection signals from the impact sensor 40.

(1) Controlling Cancelling Printing by a Tapping Operation

This control process enables cancelling printing in response to a tapping operation performed by the user.

When the receipt printer 1 receives print data containing a wait-for-tapping-operation and cancel printing command from the host device 2, the control unit 10 starts a preprinting process such as converting and storing the received print data to an image buffer after it recognizes the wait-for-tapping-operation and cancel printing command. The control unit 10 also sets the receipt printer 1 to a wait-for-tapping-operation state (wait-for-impact-detection state).

In the wait-for-tapping-operation state the control unit 10 executes the process shown in S21 to S26 in the flow chart in FIG. 3 (tapping detection process) parallel to the preprinting process and roll paper printing process.

When the wait-for-tapping-operation state is entered, the control unit 10 first initializes the tapping count stored in working memory in the control unit 10 to 0 (S21). The control unit 10 then samples the detection signal from the impact sensor 40 at a constant sampling interval (S22), determines if the detection signal (acceleration) is greater than or equal to a predetermined detection threshold (S23), and returns to S22 if it is not greater than or equal to the predetermined detection threshold. If it is determined in S23 that the detection signal is greater than or equal to the predetermined detection threshold, the tapping count is incremented by 1 (S24). Whether the incremented tapping count is greater than or equal to a preset detection count is then determined (S25), and control returns to S22 if the tapping count is not greater than or equal to the preset detection count. However, if it is determined in S25 that the incremented tapping count is greater than or equal to the preset detection count, it is determined in S26 that a preset tapping operation was performed, and this decision triggers the cancel printing process (S27). To reduce the load on the control unit 10, an interrupt process may be used when sampling (S22).

The control unit 10 continuously executes the tapping detection process in S21 to S26 until printing to roll paper is completed. If the control unit 10 determines that the prescribing tapping operation was executed before printing ends, it immediately cancels the preprinting process or roll paper printing process, erases the print data, and discharges the printed portion of the roll paper.

If printing ends without the tapping operation being detected, the control unit 10 ends the tapping detection process simultaneously to completion of the printing process.

(2) Controlling Starting Printing by a Tapping Operation

This control process suspends printing until the user performs a particular tapping operation, and starts printing when the tapping operation is detected.

When the receipt printer 1 receives print data containing a wait-for-tapping-operation and start printing command from the host device 2, the control unit 10 executes the process shown in steps S31 to S41 in the flow chart in FIG. 4.

When the control unit 10 receives the print data and recognizes a wait-for-tapping-operation and start printing command (S31), it returns a busy signal to the host device 2 based on the command to indicate that the preprinting process or tapping detection process is executing (S32). The control unit 10 then reads and converts the print data from the receive buffer and writes the result to the image buffer (S33). When the preprocess converting the print data ends, the control unit 10 does not immediately start printing the converted print data to roll paper and pauses the start of printing. The control unit 10 then enters the wait-for-tapping-operation state and executes the tapping detection process in steps S34 to S39.

The tapping detection process in steps S34 to S39 repeats until the predetermined tapping operation is detected. The process executed in steps S34 to S39 is identical to steps S21 to S26 when cancelling printing is triggered by a tapping operation as described above.

More specifically, the control unit 10 initializes the tapping count (S34), then samples the detection signal from the impact sensor 40 at a constant sampling interval (S35), determines if the detection signal is greater than or equal to a predetermined detection threshold (S36), and increments the tapping count by 1 (S37) if the detection threshold is satisfied. If the tapping count is greater than or equal to a preset detection count (S38 returns Yes), it is determined in S39 that the preset tapping operation was performed, and this decision triggers starting the process that was suspended in S33 for printing the converted print data to roll paper (S40). When printing is completed the control unit 10 sends a cancel busy signal (a ready signal) indicating that processing the print data is completed to the host device 2 (S41).

(3) Controlling Starting the Paper Cutting Operation By a Tapping Operation

This control process pauses the cutting operation of the automatic paper cutter 30 until the user performs a predetermined tapping operation, and then starts the cutting operation of the automatic paper cutter when the tapping operation is detected.

When the receipt printer 1 receives print data containing a wait-for-tapping-operation and cut paper command from the host device 2, the control unit 10 executes the process shown in steps S51 to S61 in the flow chart in FIG. 5.

When the control unit 10 receives the print data and recognizes a wait-for-tapping-operation and cut paper command (S51), it prints to roll paper after executing a preprinting process such as reading and converting the print data from the receive buffer (S52). When printing to roll paper ends, the control unit 10 does not immediately start the cutting operation of the automatic paper cutter 30 (automatically cutting the printed portion of the roll paper), but instead pauses the cutting operation and enters the wait-for-tapping-operation state. It therefore sends a busy signal indicating that the wait-for-tapping-operation state is active to the host device 2 (S53). Control then goes to the wait-for-tapping-operation state and the process shown in S54 to S59 (the tapping detection process) executes.

The tapping detection process in S54 to S59 repeats until the predetermined tapping operation is detected. The process executed in steps S54 to S59 is identical to the process in steps S21 to S26 and the process in steps S34 to S39 described above.

More specifically, the control unit 10 initializes the tapping count (S54), then samples the detection signal from the impact sensor 40 at a constant sampling interval (S55), determines if the detection signal is greater than or equal to a predetermined detection threshold (S56), and increments the tapping count by 1 (S57) if the detection threshold is satisfied. If the tapping count is greater than or equal to a preset detection count (S58 returns Yes), it is determined in S59 that the preset tapping operation was performed, and this decision triggers starting the process that was suspended in S53 for starting the cutting operation of the automatic paper cutter (S60). This results in the printed portion discharged outside the receipt printer 1 from the paper exit of the receipt printer 1 being cut from the roll. When the cutting operation is completed the control unit 10 sends a cancel busy signal (a ready signal) indicating that processing the print data is completed to the host device 2 (S61).

Effect of the Invention

As described above, when a receipt printer 1 according to this embodiment of the invention receives print data containing a wait-for-tapping-operation and cancel printing command, wait-for-tapping-operation and start printing command, or wait-for-tapping-operation and cut paper command, it enters a wait-for-tapping-operation state after recognizing the command. When a predetermined tapping operation on the housing 3 is detected based on the detection signals from the impact sensor 40, the corresponding cancel printing process, start printing process, or start cutting operation process indicated by the print data is executed.

More specifically, the user can cancel printing, start printing, start the cutting operation, or otherwise operate the receipt printer 1 by tapping a suitable part of the housing 3, such as around the paper exit, with the tip of a finger. This tapping operation can be performed easily and accurately without looking and can be done intuitively, thus improving operability and reducing operating errors.

Furthermore, if tapping operations can be accepted, it is no longer necessary to provide operating buttons on the tapping operation or front of the receipt printer 1, thus providing greater freedom installing the printer and enabling placing other objects on top of the printer. Greater freedom of design is also achieved, and operating errors caused by pressing a wrong button can be prevented.

The invention executes the tapping detection process only when print data containing a wait-for-tapping-operation is received, and whether tapping operations are accepted or not can therefore be controlled individually for each print job.

Furthermore, because a tapping operation is confirmed only when the detection threshold and detection count for evaluating tapping operations are preset and impact exceeding these settings is detected, operating errors caused by confirming a tapping operation when the user accidentally touches the housing 3 can be prevented.

When this embodiment of the invention receives a wait-for-tapping-operation and start printing command, it can pause the start of printing until the tapping operation is detected. A receipt printer 1 that is commonly carried by the user on a belt clip, for example, can therefore be tapped to start operation after the user confirms that the printout can be received without the printout discharged from the paper exit being accidentally torn off due to some external factor. The printout can therefore be reliably obtained in one piece. In addition, when a wait-for-tapping-operation and cut paper command is received, cutting the printed portion of the roll paper exposed from the paper exit can be suspended until the tapping operation is detected. Therefore, by performing the tapping operation after confirming that the printout can be received, problems such as the printout falling and being lost because the cutting operation is executed before the user is ready, or being received in an incomplete condition, can be prevented.

Other Variations (1) The embodiment described above determines if a tapping operation was performed by reading a detection threshold and detection count that are previously stored in the receipt printer 1, but the detection threshold and detection count may be included in the wait-for-tapping-operation command. In this situation a process for inputting and storing the impact detection configuration data is not necessary. The detection threshold and detection count can also be changed print job by print job. It is also possible to set the sensitivity, sampling period, and the length of the detected output pulses according to the impact sensor 40.

(2) The foregoing embodiment describes the control of the receipt printer 1 when print data containing only one wait-for-tapping-operation command is received, but print data containing a plurality of wait-for-tapping-operation commands may be sent to the receipt printer 1 and different processes may be executed according to the content and timing of the tapping operation.

For example, if print data containing a wait-for-tapping-operation and cancel printing command and a wait-for-tapping-operation and cut paper command is sent to the receipt printer 1, the control unit 10 can execute the cancel printing process if the tapping operation is detected during the pre-printing process converting the print data or while printing to the printing paper. The cutting operation of the automatic paper cutter 30 may also be paused when printing the print data is completed so that the cutting operation is executed when the tapping operation is detected after printing is completed.

It will thus be obvious that a plurality of times for accepting a tapping operation may be set in a single print job, and different processes can be executed appropriately according to the timing at which the tapping operation is detected.

Furthermore, if a plurality of wait-for-tapping-operation commands are contained in the print data for one job, different tapping operations (tapping operations that differ by the number of taps, timing, and tapping pattern) are preferably assigned to each command. This enables the user to use different tapping operations according to the process to be executed.

(3) Three processes, cancelling printing, starting printing, and starting a cutting operation, are executed when a specific tapping operation is detected in the foregoing embodiment, but reprinting the print data (reissuing a receipt), for example, may also be triggered by a tapping operation. More specifically, when print data containing a wait-for-tapping-operation and reprint command is received, the control unit 10 waits for a tapping operation without erasing the print data after printing the print data and automatically cutting the printed paper. When a predetermined tapping operation is then detected, the print data is reprinted. After reprinting, the print data may be cleared and the print job ended, or the wait-for-tapping-operation state may be resumed and the tapping detection process may continue until the next print data is input.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method for an electronic device, comprising:
a first step of receiving print data with a wait-for-impact-detection command;
a second step of enabling a wait-for-impact-detection state in response to receiving the wait-for-impact-detection command, wherein in the wait-for-impact-detection state an impact can be detected and an otherwise executable predetermined process is suspended; and
a third step of terminating the wait-for-impact-detection state in response to detecting a predetermined impact in the wait-for-impact-detection state, wherein the terminating of the wait-for-impact-detection state includes removing the suspension of the predetermined process and executing the predetermined process.

2. The control method for an electronic device described in claim 1, wherein the predetermined impact in the third step is a predetermined number of impacts.

3. The control method for an electronic device described in claim 1, wherein:
the electronic device is a printer that initiates printing of the received print data;
in the second step, the predetermined process is a cancel printing process; and
the third step executes the cancel printing process to cancel the printing of the received print data in response to detecting the predetermined impact in the wait-for-impact-detection state.

4. The control method for an electronic device described in claim 3, wherein wait-for-impact-detection is terminated in response to the printing of the received print data being finished before detection of the predetermined impact in the wait-for-impact-detection state of the third step.

5. The control method for an electronic device described in claim 1, wherein:
in the first step, the print data is received with the wait-for-impact-detection command and further received with a specified executable command;
in the second step, the specified executable command constitutes the predetermined process;
in the third step, the previously-suspended specified executable command is executed in response to detecting the predetermined impact in the wait-for-impact-detection state.

6. The control method for an electronic device described in claim 5, wherein:
the specified executable command is a start-printing-process command to print the received print data;
the second step suspends execution of the start-printing-process command; and
printing of the received print data is not initiated until the third step when suspension of the start-printing-process command is removed and the start-printing-process command is executed in response to detecting the predetermined impact in the wait-for-impact-detection state.

7. The control method for an electronic device described in claim 5, wherein:
the executable command is an automatic-printing-paper-cutting-process command to cut a printing-paper upon which the received print data may be printed;
the second step suspends execution of the automatic-printing-paper-cutting-process command; and
cutting of the printing-paper is not initiated until the third step when the automatic-printing-paper-cutting-process command is executed in response to detecting the predetermined impact in the wait-for-impact-detection state.

8. The control method for an electronic device described in claim 1, wherein:
an impact is detected when a predetermined acceleration is applied to an impact sensor; and
a threshold value of the predetermined acceleration is received and stored before the first step.

9. An electronic device comprising:
an impact detection unit; and
a control unit that enters a wait-for-impact-detection state in response to receiving print data with a wait-for-impact-detection command,
wherein:
in said wait-for-impact-detection state the control unit enables the impact detection unit suspends execution of a predetermined executable process; and
the control unit leaves the wait-for-impact-detection state in response to the impact detection unit detecting a predetermined impact, wherein as part of leaving the wait-for-impact-detection state the suspension of the predetermined executable process is removed and the predetermined executable process is executed.

10. The electronic device described in claim 9, wherein:
the predetermined impact is an impact having an acceleration equal to or greater than a preset acceleration threshold; and
the electronic device further comprises a storage unit and stores the acceleration threshold.

11. The electronic device described in claim 9, wherein:
the electronic device is a printer; that starts a printing process to print the received print data;
the predetermined process is a cancel-printing process; and
the control unit executes the cancel printing process to cancel the printing of the received print data conditional upon the impact detection unit detecting the predetermined impact in the wait-for-impact-detection state.

12. The electronic device described in claim 9, wherein:
the electronic device is a printer;
the predetermined executable process is a printing process;
the control unit suspends the printing process upon entering the wait-for-impact-detection state, and then executes the suspended printing process conditional upon the impact detection unit detecting the predetermined impact in the wait-for-impact-detection state.

13. The electronic device described in claim 9, further comprising:
a discharge path for discharging a printed portion of the printing paper; and
a cutting mechanism positioned in the discharge path;
wherein the electronic device is a printer, and
the predetermined process is a paper-cutting process that uses the cutting mechanism to cut printing paper; and
the control unit suspends operation of the cutting mechanism upon entering the wait-for-impact-detection state, and then executing the paper cutting process and operating the cutting mechanism conditional upon the impact detection unit detecting the predetermined impact in the wait-for-impact-detection state.

14. A control method for an electronic device, comprising
a first step of receiving a wait-for-impact-detection command with a specified executable command;
a second step of initiating a wait-for-impact-detection state wherein an impact detection mechanism is enabled; and
a third step of exiting the wait-for-impact-detection state in response to a predetermined impact being detected by the impact detection mechanism, wherein the exiting of the wait-for-impact-detection state includes executing the specified executable command.

15. The control method of claim 14, wherein:
in the second step, the initiating of the wait-for-impact-detection state includes suspending execution of the specified executable command while the wait-for-impact-detection state is active;
in the third step, the exiting of the wait-for-impact-detection state includes removing the suspension of the specified executable command.

16. The control method of claim 14, wherein:
the electronic device is an electronic printer; and
the specified executable command is a start-printing command.

17. The control method of claim 14, wherein:
the electronic device is an electronic printer; and
the specified executable command is a cancel-printing command.

18. The control method of claim 14, wherein:
the electronic device is an electronic printer; and
the specified executable command is a cut-printing-paper command.

19. The control method of claim 14, wherein:
the electronic printer is part of a point-of-sale (POS) device.

20. The control method of claim 14, wherein:
the first step includes receiving a trigger for executing a primary process in addition to receiving the wait-for-impact-detection command and the specified executable command; and
the third step also includes exiting the wait-for-impact-detection state in response to execution of the primary process being finished before the predetermined impact is detected by the impact detection mechanism.

\* \* \* \* \*